United States Patent [19]

Olsson

[11] Patent Number: 4,742,746

[45] Date of Patent: May 10, 1988

[54] REWORKING AND SIZING OF FLAT CONDUCTOR CABLE

[75] Inventor: Billy E. Olsson, New Cumberland, Pa.

[73] Assignee: AMP Incorporated, Harrisburg, Pa.

[21] Appl. No.: 853,072

[22] Filed: Apr. 17, 1986

[51] Int. Cl.[4] .......................... B26F 1/02; H02G 1/12

[52] U.S. Cl. ........................................ 83/387; 83/620; 83/691

[58] Field of Search ................. 83/386, 387, 620, 691, 83/697

[56] References Cited

U.S. PATENT DOCUMENTS

| | | | |
|---|---|---|---|
| 3,248,977 | 5/1966 | Schneider | 83/691 X |
| 3,477,317 | 11/1969 | Liander | 83/620 X |
| 3,797,342 | 3/1974 | Sekel | 83/620 X |
| 4,046,045 | 9/1977 | Stevens | 83/620 |
| 4,228,709 | 10/1980 | Guzay, Jr. et al. | 83/620 |
| 4,309,928 | 1/1982 | Mitrzyk, Sr. et al. | 83/387 X |

*Primary Examiner*—Z. R. Bilinsky

*Attorney, Agent, or Firm*—Bruce J. Wolstoncroft; Frederick W. Raring

[57] ABSTRACT

A flat multiconductor cable has a reworked and sized portion in which the span tolerance (distance between the outside conductors in the cable) is substantially reduced as compared to the unsized portion of the cable. An apparatus is also disclosed for reworking and sizing a flat multiconductor cable in order to reduce the tolerances in the reworked cable. A multi contact electrical connector can be installed on the reworked portion of the cable although the same connector may not be capable of accepting the cable in its original condition because of the relatively wide dimensional tolerances in the cable.

8 Claims, 8 Drawing Sheets

REWORKING AND SIZING OF FLAT CONDUCTOR CABLE

FIELD OF THE INVENTION

This invention relates to methods and apparatus for reworking and sizing flat multiconductor cables for the purpose of reducing the dimensional tolerances in the cable and thereby permitting an electrical connector to be installed on the cable. The invention is also directed to a flat multiconductor cable having a reworked and sized portion in which the dimensional tolerances have been reduced.

BACKGROUND OF THE INVENTION

A widely used type of electrical cable comprises a plurality of parallel coplanar conductors in spaced-apart relationship which are embedded in plastic insulating material. Electrical connections to the conductors in the cable are made by installing a multi contact electrical connector on the cable, the connector having a cable-receiving face and having terminals extending from the cable-receiving face. The terminals have slots that receive the conductors in the cable. The terminals are forced through the cable in a manner such that the conductors enter the slots and establish contact therewith. Thus, the mere installation of the connector on the cable also brings about electrical connections between all of the terminals in the connector and all of the conductors in the cable.

Problems can arise when the connector is installed on the cable as a result of dimensional variations in the cable itself. The terminals in the connector are relatively precisely positioned and if the cable is perfect or nearly so (as regards the center-to-center spacing of the conductors and the distance between the outside conductors in the cable) one conductor will enter the wire-receiving slot of each of the terminals in the connector when the connector is installed on the cable. However, the cable can not be manufactured to the same precise dimensional standards as can the connector and the spacing between adjacent conductors in the cable may vary within relatively wide tolerance limits. U.S. Pat. No. 4,077,695 explains this problem in detail and presents a solution for certain types of flat cable, particularly cable of the type in which each conductor is surrounded by a substantially cylindrical insulating sheath and each insulating sheath is connected to the next adjacent insulating sheath by a thin flexible web of plastic material. At the time the solution presented in the above identified U.S. Pat. No. 4,077,695 was developed, the minimum spacing between adjacent conductors in a flat conductor cable was 0.05 inches (1.27 mm) and it is feasible to provide the thin connecting web between adjacent conducting sheaths in the cable when the spacing is maintained at 1.27 mm.

Within more recent times, cable suppliers have begun to produce flat multiconductor cable in which adjacent conductors are spaced apart by only 0.025 inches (0.63 mm) and it is impractical to form the cable with a thin web as shown in the above U.S. Pat. No. 4,077,695. Because of the close spacing of the conductors, it is necessary that the insulating material extend as an almost continuous mass with the conductors embedded in the insulating material and the thickness of the insulating material varies only slightly across the width of the cable. Furthermore, the manufacturing difficulties of producing this relatively fine wire cable result in wide tolerances in the dimension between the outside conductors of the cable, the span tolerance of the cable. As a result, problems can be encountered when it is attempted to install a connector on the cable for the reason that some of the conductors in the cable may not line up with the proper terminals in the connector when the installation is made and shorting between adjacent conductors can be caused if a single terminal in the connector contacts two conductors in the cable.

The present invention is concerned with the reworking and sizing of flat conductor cable so that a connector can be installed on the reworked portion notwithstanding the fact that problems might be encountered in attempting to install the same connector on a portion of the cable which is not reworked and sized. The invention is further directed to the achievement of a method and apparatus for carrying out such reworking.

THE INVENTION

In accordance with one embodiment thereof, the invention comprises a reworking and sizing apparatus for reworking and sizing a flat multiconductor cable. The cable comprises a plurality of side-by-side spaced-apart coplanar parallel conductors which are embedded in plastic insulating material and which have axes which define a conductor plane. The cable has parallel side cable edges and oppositely-facing first and second major cable surfaces. Each of the cable surfaces have, in transverse cross section, a series of cylindrical opposed and aligned convex projections with a conductor centrally located in the cable with respect to each pair of opposed projections. The spacing between the axes of adjacent conductors is $d \pm x$ where d is the nominal spacing and x is the spacing tolerance. The span distance between the two outside conductors, which are immediately adjacent to the cable side edges, is $(n-1)d \pm s$ where n is the number of conductors and s is the span tolerance. The span tolerance in such cables is greater than the spacing tolerance. The apparatus is characterized in that it comprises first and second tooling members and a plurality of punches. The first and second tooling members have tool side edges and opposed first and second tool surfaces which extend between the tool side edges. The tooling members are movable between an open position in which they are spaced apart and a closed position in which they are substantially against each other. The first and second tool surfaces have side-by-side parallel concave depressions which extend parallel to the tool side edges and which conform to the convex projections on the cable surfaces. The center-to-center spacing between adjacent depressions is d and the outside depressions, which are adjacent to the tool side edges, are spaced apart by a distance substantially equal to $(n-1)d$. Each of the first and second tool surfaces has a plurality of openings extending therein with an opening between each adjacent pair of depressions. The punches are on the first tooling member and extend into the openings in the first tool surface. The punches have leading ends which are proximate to the first tool surface and are movable through the openings in the first tooling member and into the openings in the second tooling member. Actuating means are provided for sequentially moving the first and second tooling members from their open positions to their closed positions and for thereafter moving the punches through the openings in the first tooling member and into the openings in the second tooling member whereby upon placement of a portion of the cable between the first and second tool surfaces with the projections on the cable surfaces in approximate alignment with the depressions on the tool surfaces, thereafter moving the tooling members to their closed positions, at least some of the conductors will be moved laterally in the conductor plane so that each conductor will be centrally located between an opposed pair of depressions on the first and second tooling surfaces. Upon subsequent movement of the punches through the cable and into the openings in the second tooling member, holes will be punched in the cable between adjacent conductors and the span tolerance of the cable will be reduced.

In accordance with the method aspect of the invention, a portion of a flat conductor cable is reworked and sized by clamping the portion of the cable between opposed first and second clamping surfaces which are opposed to the first and second cable surfaces. While clamped, at least some of the conductors are moved laterally in the conductor plane relative to the conductor axes with accompanying deformation of plastic insulating material which is between adjacent conductors, the movement of the conductors causing a reduction in the span tolerance of the cable. Thereafter, holes are punched in the predetermined portion of the cable between adjacent conductors and the plastic insulating material which has been deformed as a result of movement of the conductors is removed. The cable is then unclamped and as a result of these operations, the predetermined portion of the cable is sized and reworked and the span tolerance is reduced.

In accordance with a further aspect, the invention comprises a flat multiconductor cable which has a reworked and sized portion. In this reworked and sized portion, the span tolerance, which is the variation due to manufacturing tolerances of the distance between the outside conductors in the cable, is substantially reduced so that an electrical connector can be installed on the reworked portion of the cable.

THE DRAWING FIGURES

THE DISCLOSED EMBODIMENT

Figure 8:
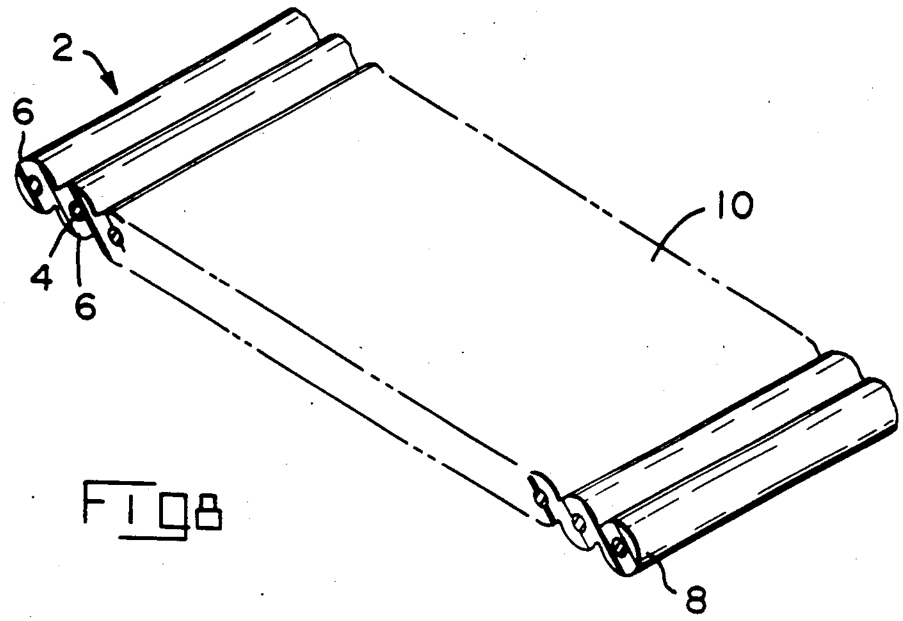
FIG. 8 is a perspective view of a flat conductor cable.
Figure 9:
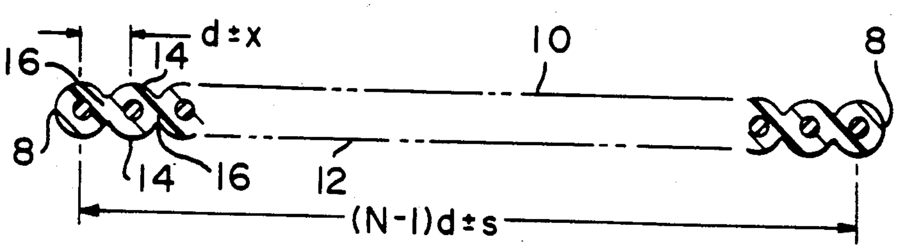
FIG. 9 is a perspective view of a portion of the cable on a greatly enlarged scale.

Referring first to FIGS. 8 and 9, a flat conductor cable 2 of the type which can be reworked in accordance with the present invention comprises a plurality of parallel side-by-side conductors 4 embedded in plastic material 6. The conductors are coplanar and define a conductor plane to which reference will be made below. The cable has parallel side edges 8, and upper or first major surface 10, and a lower or second major surface 12.

The upper and lower surfaces 10, 12 have, in transverse cross section, a series of cylindrical convex projections 14, each projection having a conductor 4 centrally located with respect thereto. The projections on the two surfaces 10, 12, are opposed to, and in alignment with, each other. The type of cable shown has a continuous thick mass insulating material 16. FIG. 9, between adjacent conductors rather than a thin membrane as with some known types of flat cable.

Figure 5:
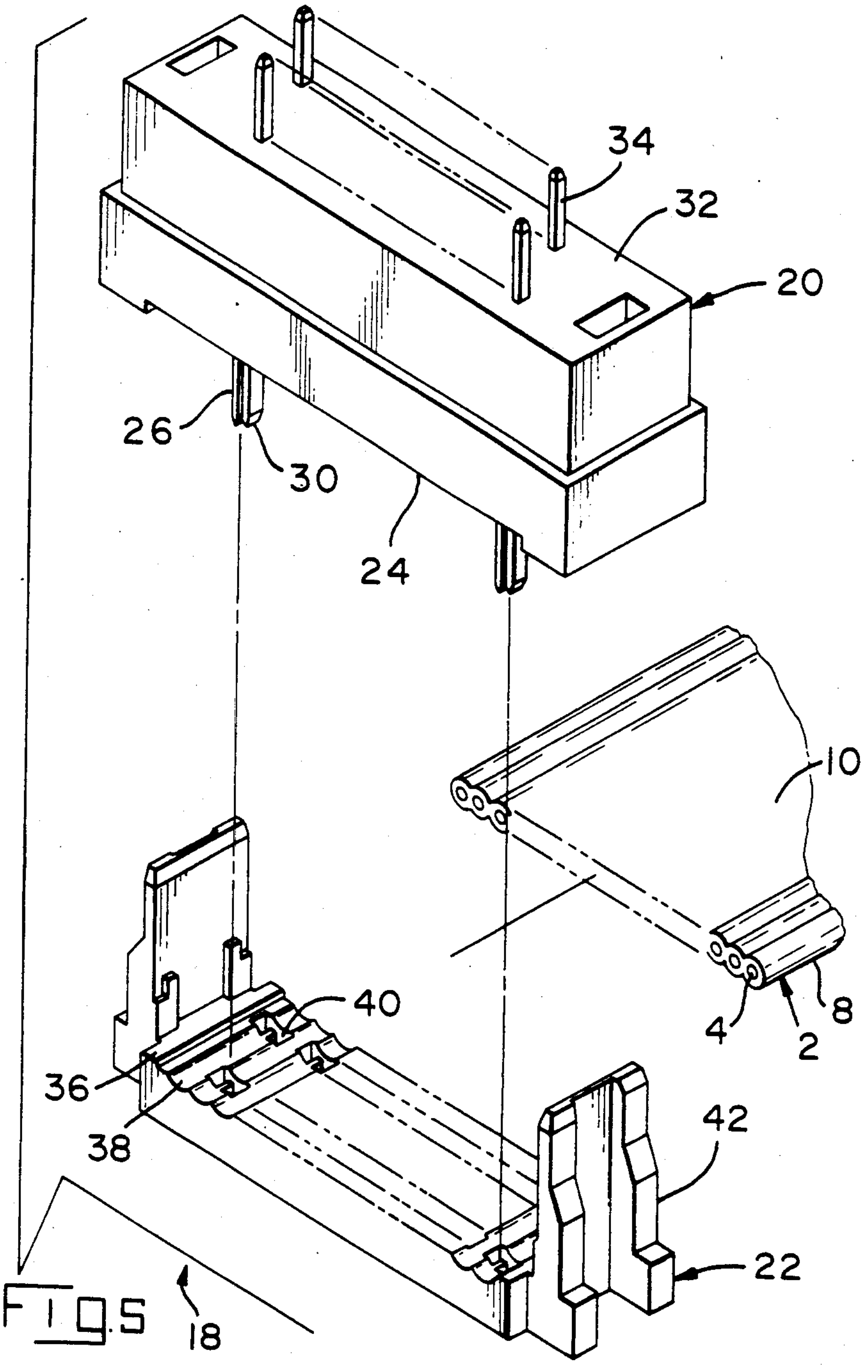
FIG. 5 is a perspective view of a connector of the type used with flat conductor cables.
Figure 6:
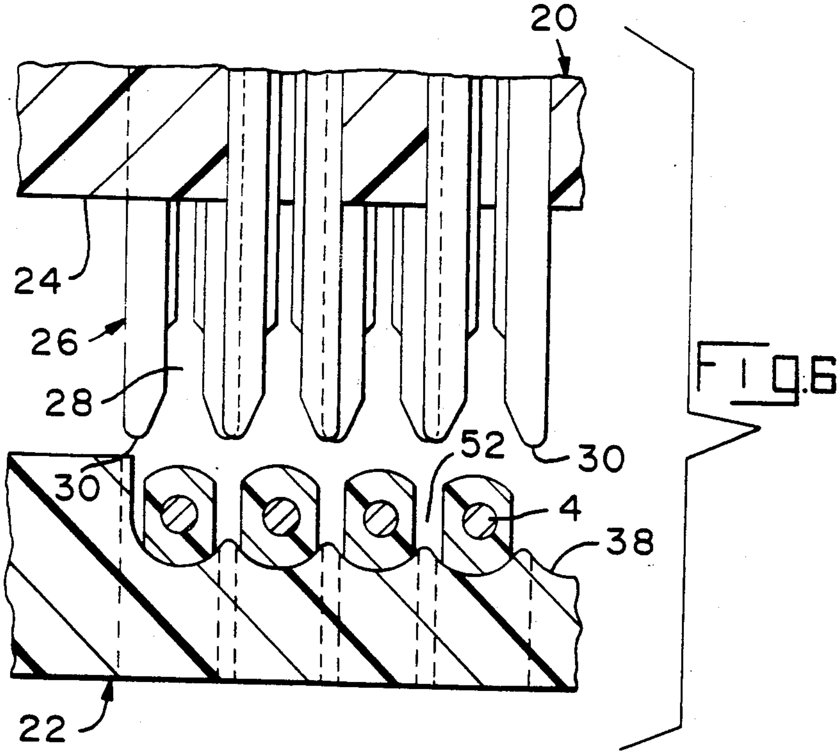
FIG. 6 is a fragmentary view showing a portion of a cable which has been reworked in accordance with the present invention positioned in the connector in preparation for assembly of the connector to the cable.
Figure 7:
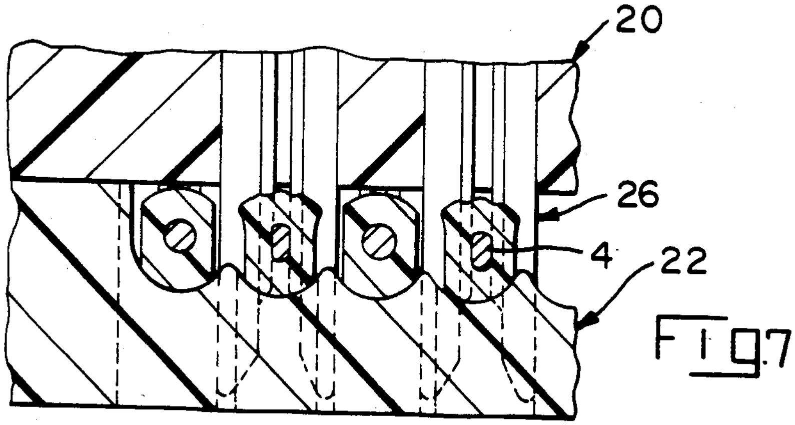
FIG. 7 is a view similar to FIG. 6 showing the connector installed on the cable.
Figure 13:
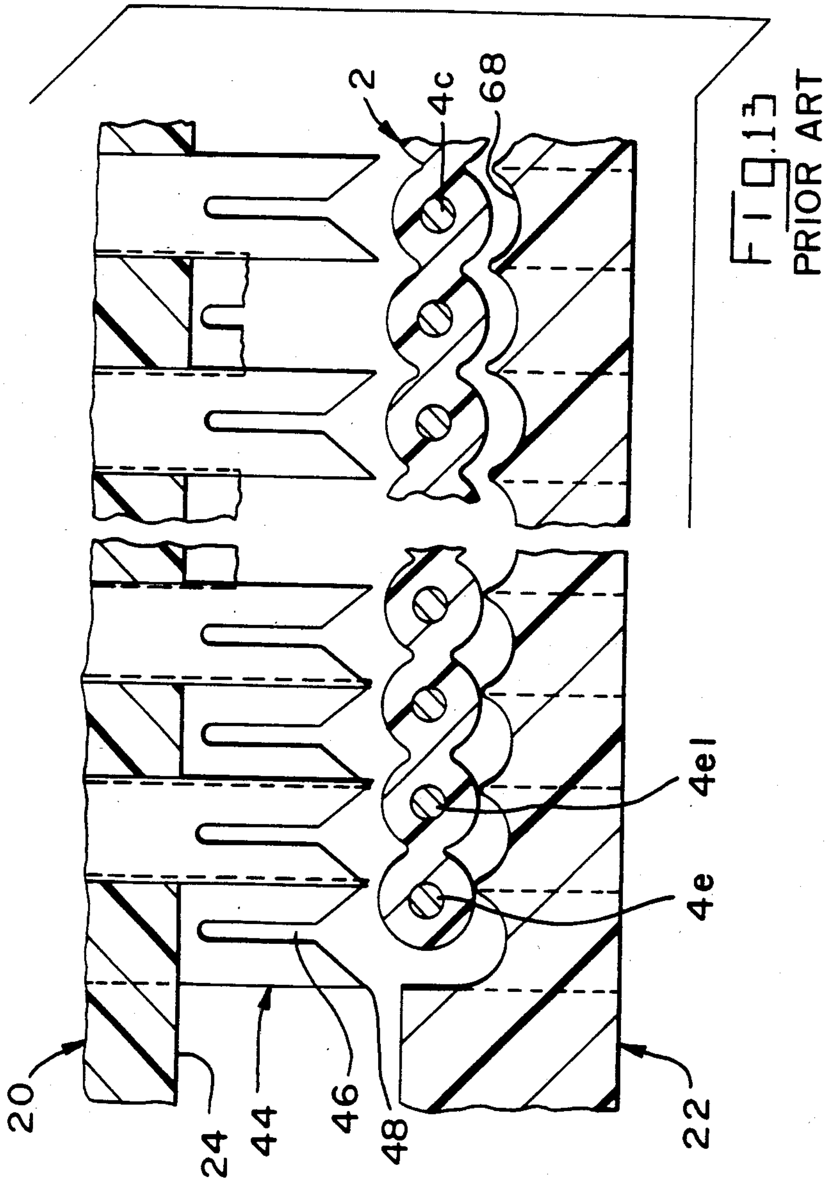
FIG. 13 PRIOR ART
FIG. 13 is a view similar to FIG. 6 showing features of a prior art connector and showing a cable which has not been reworked in accordance with the invention.

FIG. 5 shows a multi contact connector 18 of a type which is installed on a cable to establish electrical contact with the conductors in the cable. The connector 18 comprises a generally prismatic housing 20 and a cover 22 for the housing 20. The housing has a cable-receiving face 24 which is directed downwardly in FIG. 5 and has terminals 26 which extend from the face 24. The terminals shown in FIGS. 5 and 6 are the type described fully in U.S. application Ser. No. 704,458 filed Feb. 22, 1985, now U.S. Pat. No. 4,600,259. FIG. 13 shows an alternative type of terminal which is commonly used in connector housings of the general type shown in FIGS. 5 and 6. The terminals are usually arranged in two or more parallel rows which extend between the endwalls of the connector with the terminals in one row staggered with respect to the terminals in the other row. The terminals have free ends 30 which are spaced from the cable-receiving face 24 and wire-receiving slots 28 which extend inwardly from the free end. Electrical contact is established by forcing a conductor into a slot so that the opposed surfaces of the slot contact the conductor. The upper face 32 of the housing 20 has terminal posts 34 extending therefrom which are integral with the lower portions 26 of the terminals.

The cover 22 has a surface 36 which is opposed to the cable-receiving surface 24 of the housing and has side-by-side concave depressions 38 in the surface 36. These concave depressions have substantially the same radius of curvature as do the convex cylindrical projections 14 on the cable so that the depressions conform to the surface of the cable. Openings 40 extend through the cover so that the leading ends 30 of the terminals can be passed through these openings when the connector is installed on the cable. The cover is secured to the housing by means of latch arms 42 at each end of the cover.

When a connector as shown in FIG. 5 is to be installed on a cable 2, it is merely necessary to position the cable on the cover member with the projections on the lower surface of the cable received in the depressions 38 of the cover. Thereafter, the cover and the housing are assembled to each other in a manner such that the terminals move through the cable and the individual conductors move into the wire-receiving slots of the terminals.

The assembly procedure briefly described above requires that each of the conductors 4 in the cable be in substantial alignment with the wire-receiving slot of a terminal to which it is to be connected. If the cable is dimensionally perfect, the installation of the connector on the cable will proceed as described above. However, all manufactured articles have dimensional tolerances; that is to say the dimensions of the article are not absolute but rather lie within specified limits. Thus, cable as shown at 2 may have a nominal center-to-center spacing d between adjacent conductors 4 of 0.05 inches plus or minus (±) a dimensional tolerance x. In the case of a cable having conductors on 0.050 centers, this tolerance, x, is commonly about 0.003 inches.

The span of a cable of the type shown at 2 is regarded as the distance between the outside conductors, that is the conductors 4 which are immediately adjacent to the side edges 8. The span is equal to $(n-1)d \pm s$ where n is the number of conductors in the cable and s is the span tolerance. The span tolerance s of a cable 2 is greater by a significant amount than the spacing tolerance x for the reason that the variations in the positions of the conductors as a result of the spacing tolerance do not always cancel each other out and the manufacturers of cables therefor establish a span tolerance, s, which is substantially greater than the spacing tolerance x.

The finest or highest density cable presently available (the cable having the closest spacing and the smallest conductors) has a nominal spacing d between adjacent conductors 4 of 0.025 inches (0.63 mm) with a spacing tolerance x of ±0.002 inches. The span tolerance s for this type of cable is ±0.008 inches for a cable having no more than sixty conductors therein and is ±0.015 inches for a cable having over sixty conductors therein. These tolerances are relatively wide and result from the fact that it is impossible to make the cable with a higher degree of dimensional precision.

FIG. 13 illustrates the problems which can arise when a connector is installed on a cable 2 in accordance with present known practice. In FIG. 13, it is assumed that the cable is within the span tolerance but close to the limit on the minus side. Also in FIG. 13, the terminals 44 are of the well-known type which comprise a flat plate-like member having a wire-receiving slot 46 therein. The free ends of the terminal are pointed as shown at 48 so that the terminal will pierce the insulation as it must do when the connector housing is moved relatively downwardly from the position shown in FIG. 13.

It can be seen that the conductor 4c in FIG. 13, which is assumed to be the center conductor in the cable midway between the side edges, is in alignment with its depression 38. However, the conductor 4e on the lift-hand end of the cable is not in alignment with its associated depression 38; rather, the cylindrical projection associated with conductor 4e is against the ridge or cusp which is between two depressions. Similarly, those conductors which are adjacent to conductor 4e are not in alignment with their associated depressions 38 but are rather offset from them. The terminals 44, however, are positioned with a very high degree of precision on the connector housing and they are in alignment with their associated depressions 38 on the cover member. It should be explained that parts such as molded housings and covers for connectors can be produced with a very high degree of dimensional precision as compared with cables which aree manufactured by extruding insulation on wires.

If the connector housing were to be moved relatively downwardly from the position of FIG. 13 and assembled to the connector cover, it is apparrent that the left-hand terminal in the foreground in FIG. 13 would contact not only the second conductor from the side, conductor 4$e_1$, but will also contact conductor 4e. This would result in the two conductors being shorted or connected to each other and is, of course, a totally; unacceptable situation. The possibility of shorting is paticularly strong if the conductors are stranded wire rather than solid wire.

FIG. 13 thus demonstrates that serious problems can be encountered when a cable is connected to terminals in a connector even if the cable is within its dimensional tolerance limits, particularly its span tolerance, these problems result from the fact that there is simply a limit to the precision with which such cables can be manuffactured.

Figure 10:
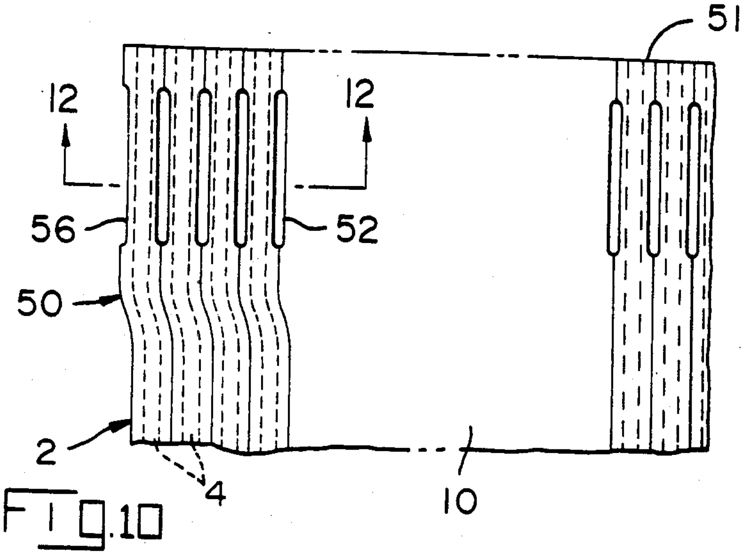
FIGS. 10 and 11 are plane views of a cable which has been reworked and sized in accordance with the invention.
Figure 11:
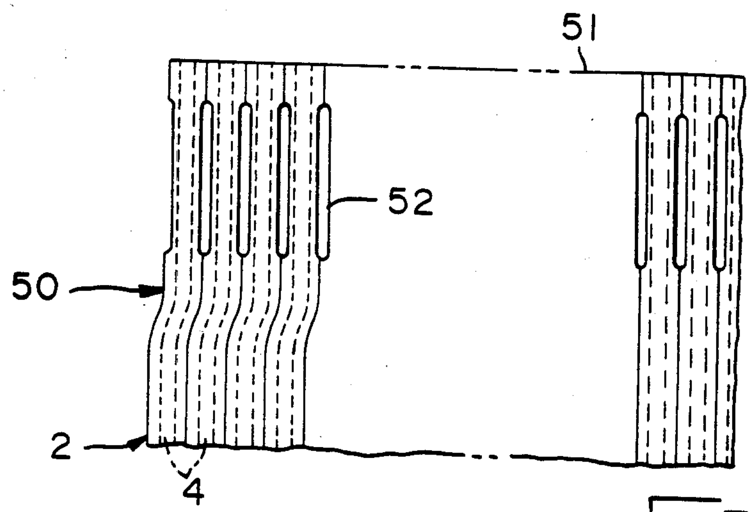
Figure 12:
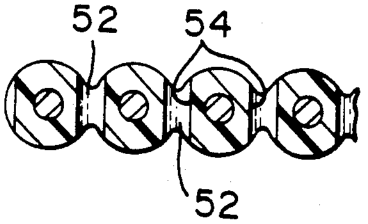
FIG. 12 is a view looking in the direction of the arrows 12—12 of FIG. 10.

In accordance with the present invention, the cable is reworked and size as shown in FIGS. 10–12. In FIG. 10, the cable 2 has a reworked portion 50 which is adjacent to its end 51. In the reworked portion 50, holes 52 are provided between adjacent conductors, these holes having been produced by punching as described below so that some of the plastic material is removed from the cable and the sides 54 of the holes are opposed and substantially parallel to each other, see FIG. 12. In addition, the side edge 8 is notched as shown at 56.

In the reworked portion 50, FIG. 10, several of the conductors shown on the left have been displaced laterally in the conductor plane with respect to their axes as evidenced by the curvature in the axis of each conductor adjacent to the reworked section 50. This lateral displacement of the conductors in the reworked portion was brought about in order to reduce the span tolerance s of the cable and to permit it to be used with a connector as shown in FIG. 6. In FIG. 11, the reworked portion 50 has conductors which have been displaced rightwardly as viewed in this figure. In FIG. 10, the cable in its original condition was undersized (on the minus side of the tolerance limits) so that it was necessary to displace some of the conductors leftwardly to increase the span in the reworked zone. In FIG. 11, the cable in its original condition is oversized so it was necessary to reduce the cable span by displacing some of the conductors rightwardly.

In other words, if the width of the cable as received from the manufacturer is $(n-1)d \pm s$, the width of the cable in the reworked portion 50 is $(n-1) \pm s'$ where $s'$ is less than s.

When the cable is reworked as shown in FIGS. 10–12, it can then be placed on the cover 22 of the connector as shown in FIG. 6 and each of the conductors will be substantially centered with relationship to its associated depression 38. The cylindrical surfaces of the insulating sheaths in the reworked portions will be against the surfaces of the depressions 38 so that all of the conductors will be aligned with the wire-receiving slots 28 of the terminals. Hence, installation of the connector on the cable can be carried out with ease.

FIGS. 1–4 show the apparatus 58 which is used to rework and size the cable. The apparatus 58 comprises an upper tooling member 60, and a lower tooling member 62. These two tooling members are mounted on guideposts 64 for movement towards and away from each other. Tooling member 60 has a downwardly facing first tooling surface 61 and tooling member 62 has an upwardly facing second surface 63. Concave cylindrical depressions 66 are provided in the surface 61 and are opposed to identical concave depressions 68 in the surface 63, these depressions extending parallel to the tool side edges 65, 67 of the tooling members. Openings 70 and 72 extend through the tooling members 60 and 62 respectively between adjacent depressions. These openings are relatively narrow and are dimensioned to receive punches 82 on a punch holder 80 in a manner described below. Additionally, openings 74 are provided at the ends of the row of depressions so that the side edges of the cable will be notched as shown in FIG. 10 at 56.

The distance between adjacent depressions 66 and depressions 68 on the tooling members 60, 62 is substantially equal to the conductor nominal or "perfect" spacing in the cables with a manufacturing tolerance. However, the manufacturing tolerance of machined parts such as those shown at 60 and 62 is extremely low as compared to the tolerances in the cable and for purposes of the present description, the machining tolerances can be disregarded.

A recess 76 extends into the upper surface 78 of the tooling member 60 and is dimensioned to receive a punch holder 80 from which the previously identified punches 82 extend. These punches have free ends 84 which are spaced from the punch holder and which are received in the openings 70 of the tooling member 60.

The punch holder 80 is secured by fasteners 88 to a crosshead or actuator bar 86 which has openings for reception of the upper ends of the guideposts 64. A lost motion coupling is provided between the crosshead and the tooling member 60 by means of rods 90 having enlarged heads which are received in recesses in the crosshead and which have threaded ends which are threaded into the tooling member 60. A spring 92 surrounds the shank portion 90 of each rod so that the tooling member 60 and the crosshead 80 can be moved relatively towards each other with the accompanying compression of the springs 92.

The upper tooling member 60 functions as a pressure pad in that it clamps the cable as will be described below and it is desirable to provide set screws 94 to serve as stops to limit downward movement of the tooling member 60 towards the tooling member 62.

If desired, a shearing edge 96 can be provided on the punch holder 80 which is cooperable with one edge 98 of the lower tooling member 62 so that when the sizing operation is carried out, the end portion of the cable will be trimmed.

Figure 1:
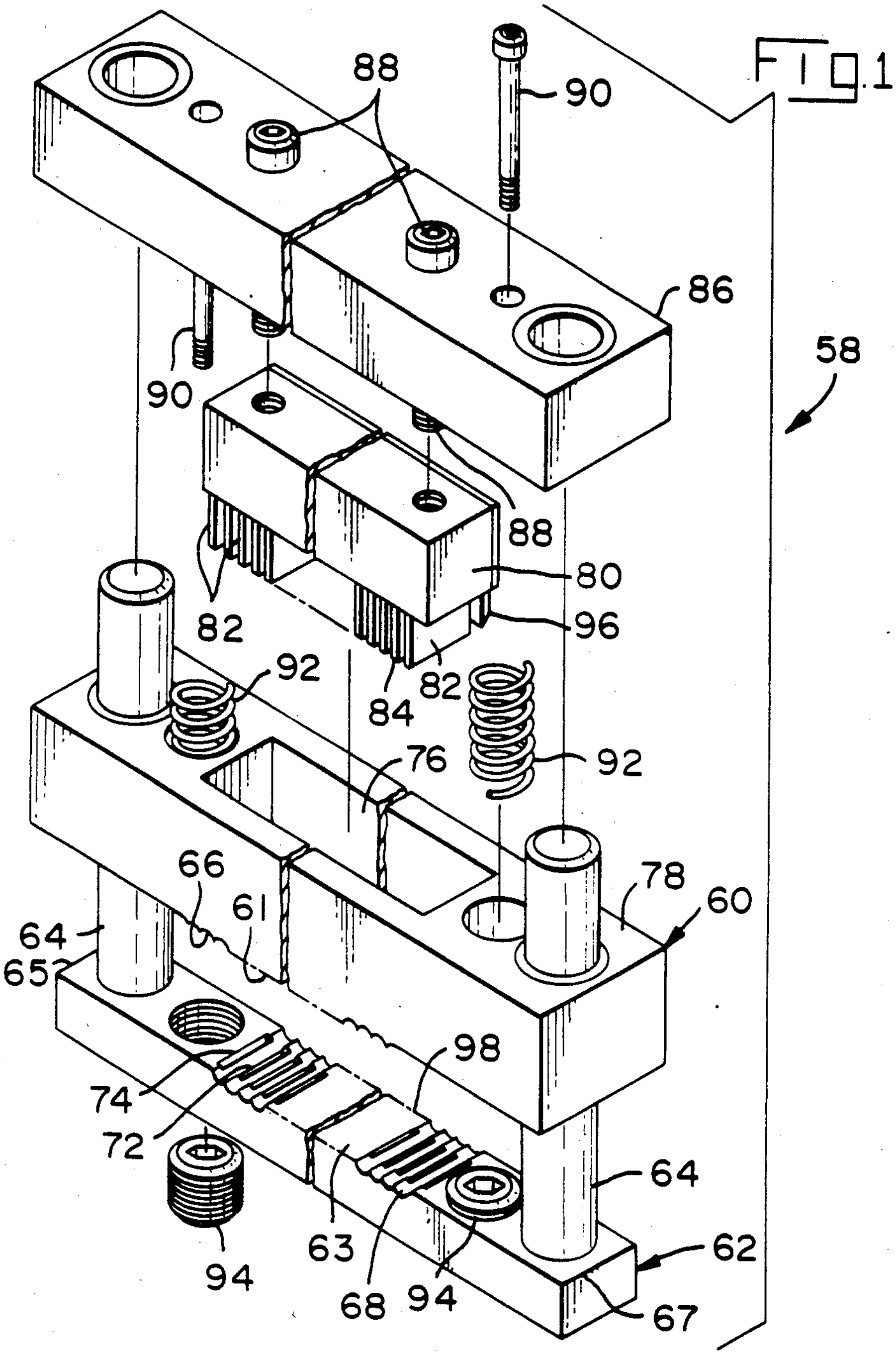
FIG. 1 is a perspective view, with the parts exploded from each other, of an apparatus in accordance with the invention.
Figure 2:
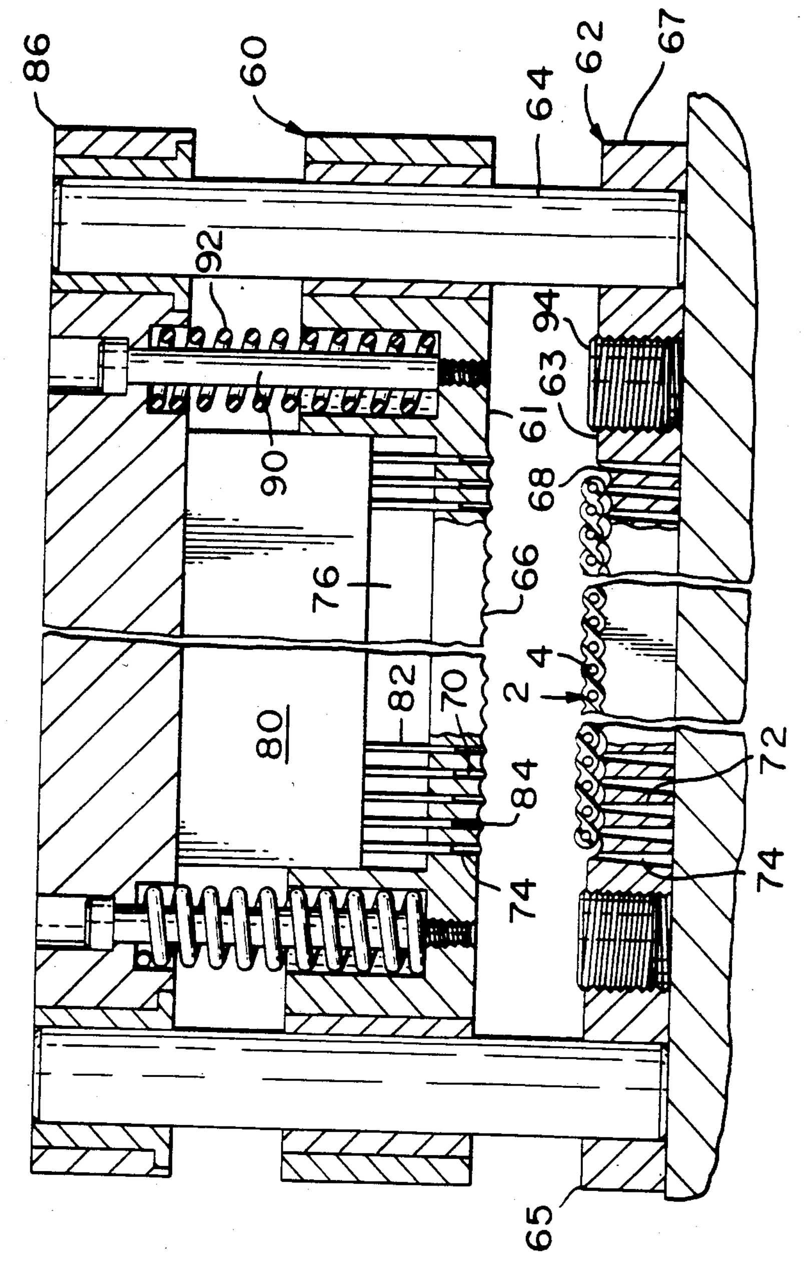
FIG. 2 is a frontal view of the apparatus of FIG. 1 showing the positions of the parts prior to the commencement of a reworking and sizing operation with the tooling parts in their open positions.
Figure 4:
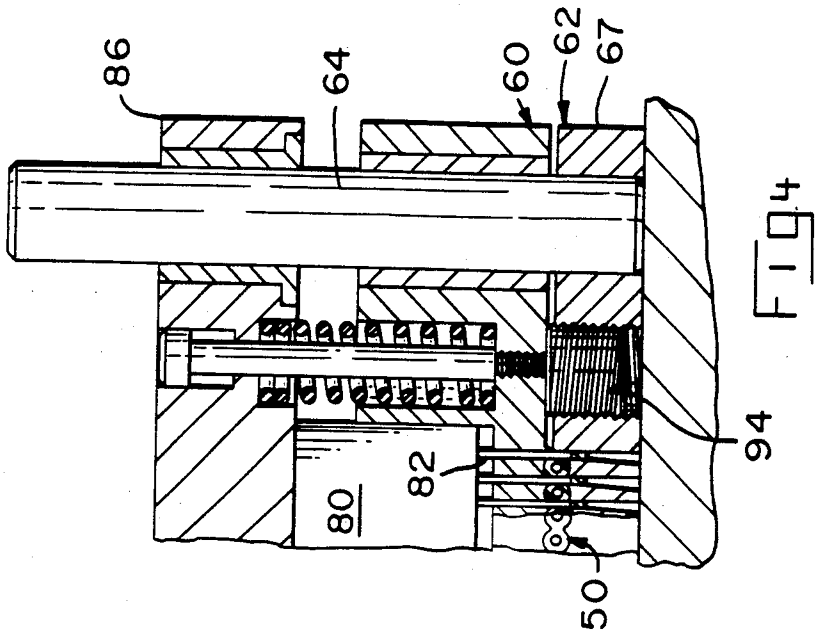
FIG. 4 is a view similar to FIG. 3 illustrating the operation of punching holes in the cable.
Figure 3:
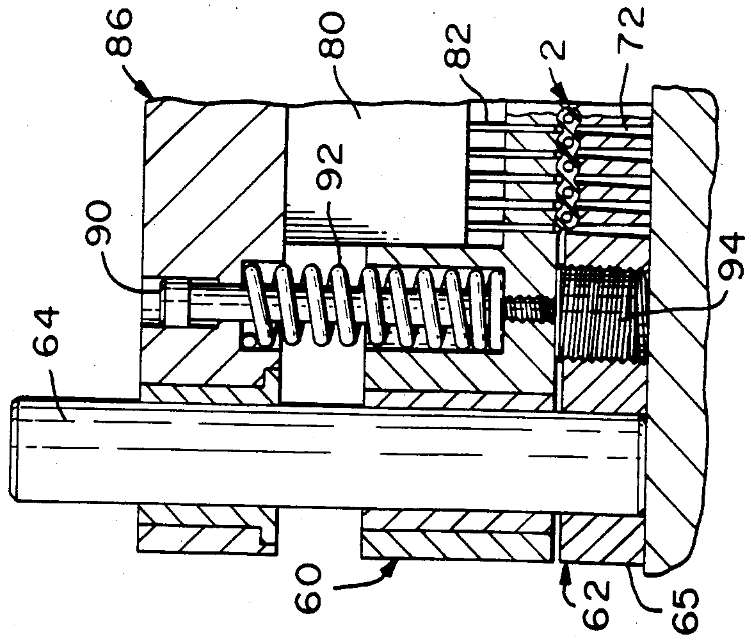
FIG. 3 is a view similar to FIG. 2 but showing the positions of the parts after the cable has been clamped in the apparatus with the tooling parts in their closed position.

The use of the apparatus is illustrated in FIGS. 2–4. Normally, the parts are in the positions of FIG. 2 with the pressure pad or upper tooling member 60 spaced from the lower tooling member 62. The cable is first positioned between the two tooling members with the cylindrical projections 14 in the depressions 68 on the lower tooling member 62. Thereafter the crosshead 80 is moved downwardly by a suitable press ram or the like until the cable is clamped between the opposed surfaces 61 and 63. At this stage, the punch holder 80 will not have moved through the pressure pad or upper tooling member 60 and the free ends 84 of the punches will be adjacent to the surface 61 as also shown in FIG. 3. Upon further downward movement of the crosshead, the springs 92 are compressed and the punches moved downwardly through the cable and into the openings 72 in the lower tooling member. During such movement, the material 16 between adjacent conductors in the cable is punched out or removed, leaving the openings 52 between adjacent conductors.

It will be apparent from FIGS. 2–4 that if the cable is manufactured within its tolerance limits but is on either the plus or minus side as regards its span tolerance, the individual conductors will be moved laterally in the conductor plane as the pressure pad moves downwardly. Such lateral movement of the conductors is brought about by virtue of the fact that the surfaces of the depressions in the tooling members engage the convex projections on the cable and cause them to move leftwardly or rightwardly as required and thereby displace the conductors until the conductors are gripped and located between the opposed depressions of the tooling members.

During such compression of the cable, and lateral movement of the conductors, the plastic material 16 which is between adjacent conductors will be elastically compressed or stretched (depending upon the direction of movement of the conductors). It is therefore necessary to remove this material by the punching operation so that it does not cause the conductors to return to their normal positions when the cable is removed from between the clamping surfaces of the tooling members.

The salient advantage of the invention is, of course, that the cable need not be manufactured to exacting physical dimensions in order for it to be suitable for use with an electrical connector. The reworking and sizing of the cable compensates for any dimensional variations in the cable as a result of manufacturing tolerances and a small portion of the cable is reworked so that the conductors in that portion of the cable are relatively precisely located.

An added advantage of the invention can be appreciated if FIG. 13 is compared with FIG. 6. In accordance with the prior art practice, FIG. 13, it is necessary to provide pointed ends 48 on the terminals 44 and to drive these terminals through the rather heavy insulating material of the cable. This means that substantial force is required to install a connector on the cable if terminals as shown in FIG. 13 are used on cable which has not been prepared and reworked in accordance with the present invention. On the other hand, it can be appreciated from an inspection of FIG. 6 that the individual terminals 26 can be moved downwardly with relative ease and the rounded leading ends 30 will slip smoothly into the openings in the cable while the conductors of the cable will move into the wire-receiving slots 28. Installation of the connector on the cable thus becomes a less arduous task than is the case with prior art devices.

An additional advantage acheived in the practice of the invention is that the width of the terminals as viewed in FIGS. 6 and 13 can be increased. Clearly, the relative widths of the terminals shown in FIG. 13 could not be increased beyond that shown without increasing the already present possibility of shorting between adjacent conductors as explained above. However, when the cable has been reworked and terminals having rounded ends 30 are used, there is no danger of shorting even if the terminals 26 are made wider than the terminals 44 shown in FIG. 13. This advantage is important in view of the small size of the terminals; the prior art terminals 44 will be inherently weaker than the terminals 26 and will be subject to damage.

It should be mentioned that the reworked and sized cable will not be dimensionally pefect and will have a centerline tolerance which is significantly less than the tolerance of the cable in its manufactured condition. Therefore, the conductors 4 in FIG. 6 will not be perfectly aligned with the depressions 38. However, the rounded ends 30 of the terminals will move the conductors into substantially perfectly centered positions in the depressions 38 while the conductors are moving into the slots 28.

I claim:

1. Reworking and sizing apparatus for reworking and sizing a flat multiconductor cable, the cable comprising a plurality of side-by-side spaced-apart coplanar parallel conductors, the conductors being embedded in plastic insulating material and having axes which define a conductor plane, the cable having parallel side cable edges and oppositely-facing first and second major cable surfaces, each of the cable surfaces having, in transverse cross section, a series of cylindrical opposed and aligned convex projections with a conductor centrally located in the cable with respect to each pair of opposed projections, the spacing between the axes of adjacent conductors being $d \pm x$ where d is the nominal spacing and x is the spacing tolerance, the span distance between the two outside conductors, which are immediately adjacent to the side cable edges, being $(n-1)d \pm s$ where n is the number of conductors and s is the span tolerance, the span tolerance s being greater than the spacing tolerance x, the apparatus being characterized in that:

the apparatus comprises first and second tooling members and a plurality of punches, the first and second tooling members having tool side edges and opposed first and second tooling members having tool side edges and opposed first and second tool surfaces which extend between the tool side edges, the tooling members being movable between open positions and closed positions, the first and second tool surfaces each having side-by-side parallel concave depressions which extend parallel to the tool side edges and which conform to the convex projections on the cable surfaces, the depressions on the first and second tool surfaces being in opposed aligned relationship, the center-to-center spacing between adjacent depressions being d, the outside depressions, which are adjacent to the tool side edges, being spaced apart by a distance substantially equal to $(n-1)d$, the first and second tool surfaces being substantially against each other when the tooling members are in the closed positions and being spaced apart when they are in their open positions, each of the first and second tool surfaces having a plurality of openings extending therein with an opening between each adjacent pair of depressions, the punches being on the first tooling member and extending into the openings in the first tool surface, the punches having leading ends which are proximate to the first tool surface, and are movable through the openings in the first tooling member and into the openings in the second tooling member, and actuating means are provided for sequentially moving the first and second tooling members from their open positions to their closed positions, and thereafter moving the punches through the openings in the first tooling member and into the openings in the second tooling member whereby, upon placement of a portion of the cable between the first and second tool surfaces with the projections on the cable surfaces in approximate alignment with the depressions on the tool surfaces, and thereafter moving the tooling members to their closed positions, at least some of the conductors will be moved laterally in the conductor plane by the engagement of the concave depressions of the first and second surfaces with the convex projection of the cable so that the conductor will be centrally located between an opposed pair of depressions on the first and second tool surfaces, and upon subsequent movement of the punches through the cable and into the openings in the second tooling member, holes will be punched in the cable between adjacent conductors and the span tolerance s will be reduced.

2. Reworking and sizing apparatus as set forth in claim 1 characterized in that the punches are mounted in, and extend from, a punch holder, the punch holder being movably mounted on the first tooling member.

3. Reworking and sizing apparatus as set forth in claim 2 characterized in that the first tooling member has a recess therein, the punch holder being movably mounted in the recess.

4. Reworking and sizing apparatus as set forth in claim 3 characterized in that the actuating means comprises an actuator block which extends beside the first tooling member, the punch holder being between the first tooling member and the actuator block, the actuator block being movable from a retracted position towards the first tooling block, the actuator block being coupled on the first tooling member by lost motion coupling means.

5. Apparatus as set forth in claim 4 characterized in that the punch holder is secured to the actuator block.

6. Apparatus as set forth in claim 5 characterized in that the punch holder and the second tooling member have cooperable shearing edges thereon extending normally of the second tool side edges for trimming the cable side edges during movement of the tooling members to the closed positions.

7. Apparatus as set forth in either of claims 1 or 6 characterized in that the first and second tooling members have guide means for guiding the tooling members from the open positions to the closed positions.

8. Apparatus as set forth in either of claims 1 or 6 characterized in that the punches are in parallel side-by-side relationship in a row, and outside punches are provided at the ends of the row for notching the cable side edges when the holes are punched.

* * * * *